United States Patent [19]

Seelmann

[11] Patent Number: 4,458,485
[45] Date of Patent: Jul. 10, 1984

[54] CONTROLS FOR DIFFERENTIAL SPEED CONTROLLED VEHICLE

[75] Inventor: Herbert Seelmann, Aschaffenburg, Fed. Rep. of Germany

[73] Assignee: Linde Aktiengesellschaft, Hollriegelskreuth, Fed. Rep. of Germany

[21] Appl. No.: 355,927

[22] Filed: Mar. 8, 1982

[30] Foreign Application Priority Data

Mar. 12, 1981 [DE] Fed. Rep. of Germany ....... 3109491

[51] Int. Cl.³ ...................... B62D 11/04; F16D 31/02
[52] U.S. Cl. ........................................ 60/421; 60/427; 60/444; 60/445; 60/484; 180/6.48
[58] Field of Search ................. 60/420, 421, 423, 427, 60/428, 429, 443, 444, 445, 484, 486, 487, 490; 180/6.48, 307

[56] References Cited

U.S. PATENT DOCUMENTS

| 3,672,161 | 6/1972 | Krusche et al. | 180/6.48 |
| 4,076,090 | 2/1978 | Krusche et al. | 180/6.48 |
| 4,324,098 | 4/1982 | Aruga et al. | 180/6.48 |

FOREIGN PATENT DOCUMENTS 2824448 12/1979 Fed. Rep. of Germany ..... 180/6.48

*Primary Examiner*—Robert E. Garrett
*Assistant Examiner*—Randolph A. Smith
*Attorney, Agent, or Firm*—Buell, Blenko, Ziesenheim & Beck

[57] ABSTRACT

A control is provided for the drive of a motor vehicle with differential-speed steering and with a hydrostatic power transmission unit on each side of the vehicle, where the adjusting element of each of the two power transmission units is provided with a spring-loaded adjusting piston that can be acted upon by control pressure, in which case two pairs of control pressure pick-offs are provided, of which two are assigned to forward and backward movement and the other two are assigned to cornering, where a pressure-dependent switchable pilot valve is installed in the connecting line between a control pressure pick-off assigned to a cornering direction and the adjusting element of the assigned power transmission unit, the pilot valve connects this control pressure pick-off assigned to the cornering direction with a specific pressure chamber of the adjusting element of the power transmission unit on the side of the vehicle on the inside of the curve, so that through actuation of the control pressure pick-off determining the curve radius, the latter can be steadily diminished through the point where the power transmission shaft on the inside of the curve stands still and up to the oppositely directed rotation of the power transmission units on the two sides of the vehicle.

7 Claims, 2 Drawing Figures

CONTROLS FOR DIFFERENTIAL SPEED CONTROLLED VEHICLE

This invention relates to controls for differential speed controlled vehicles and particularly to a control for a differential speed controlled endless track vehicle, in which the drive wheel of each side of the vehicle is driven by means of a hydrostatic power transmission whose adjusting element can be adjusted by an arbitrarily controlled control pressure, in which case four arbitrarily actuatable control pressure pick-offs are provided, of which two are assigned to each other, where two of these control pressure pick-offs are assigned to the control of the direction and speed of travel and they are connected during actuation with the adjusting elements of the hydrostatic power transmissions of both vehicle sides and act upon a pressure chamber on one side of the adjusting piston of the respective adjusting element with the same pressure, in which case each of the two other control pressure pick-offs is connected during actuation with the pressure chamber opposite the said pressure chamber on the other side of the adjusting piston of the adjusting element of the hydrostatic power transmission of the vehicle side on which this control pressure pick-off is located. A steering control of this type is known from DE-OS Pat. No. 2,511,176 and has been quite successful, however, it has turned out that this control still presents minor shortcomings. In this familiar steering control the radius of the cornering curve can be steadily decreased by actuating a steering control pressure pick-off assigned to control of the curve radius, in the extreme case, up to a complete stoppage of the power transmission shaft on the inside of the curve. However, in order to achieve a turning of the vehicle around the vertical longitudinal axis by oppositely directed drive on both sides, an additional pilot valve must be actuated because the control pressures pass from the control pressure pick-offs through a system of pressure switching two-way valves to the operating cylinders in which the adjusting pistons are capable of sliding, in which case, if the pressure set at the control pressure pick-off that determines the cornering travel is higher than the pressure set at the control pressure pick-off determining the travel speed, the pressure chambers on both sides of the adjusting piston of the adjusting element of the power transmission unit on the inside of the curve are acted upon by the same pressure and thus the adjusting piston is held fast by the spring force in the position assigned to stoppage of the power transmission shaft even if the control pressure coming from the control pressure pick-off that determines the cornering curve radius is further increased. This is caused by the fact that the line coming from the control pressure pick-off determining the travel speed is closed at the pressure switching two-way valve at which the control pressure coming from the control pressure pick-off assigned to travel speed control, on the one hand, and the control pressure coming from the control pressure pick-off that determines the curve radius, on the other hand, hold steady, with a predominance of the latter.

The invention proposes to improve an arrangement of the above type through the fact that the curve radius can be steadily decreased by actuating the control pressure pick-off that determines the curve radius, not only up to stoppage of the power transmission shaft on the inside of the curve, but up to the opposite rotation of the power transmission drives on both sides of the vehicle.

This goal is provided in the present invention by providing in a structure of the foregoing type, a switchable pilot valve that is dependent on the pressure in a control pressure line emerging from a control pressure pick-off of the control pressure pick-off pair assigned to the travel direction and velocity, said switchable pilot valve being located in the connecting line between one of the control pressure pick-offs assigned to the cornering and adjusting element of the assigned power transmission, in which case the pilot valve connects the control pressure pick-off assigned to the cornering element with the pressure chamber of the adjusting element of the power transmission of the vehicle side on the inside of the cornering curve which is not acted upon by the control pressure generated by one of the control pressure pick-offs of the control pressure pick-off pair assigned to the direction and velocity of travel. The additional controlled pilot valve, dependent on the pressure of the control pressure pick-off determining the direction and speed of travel, to a power transmission assigned to one side of the vehicle has the result that during actuation of one of the two control pressure pick-offs assigned to one direction of travel the two pilot valves are brought into an unequivocal switch position, in which they remain until this control pressure pick-off determining a certain direction of travel is actuated. Now if one of the two control pressure pick-offs that determine the radius of a steering curve is actuated, it is clearly determined by the pilot valve which side of the adjusting piston of the power transmission adjusting element this control pressure pick-off determining the curve radius acts on. By dispensing with a pressure switching two-way valve, which was present in the previous familiar design, the connection of both sides of the adjusting piston with the same control pressure line is avoided if the pressure coming from the control pressure pick-off determining the curve radius exceeds the pressure coming from the control pressure pick-off determining the travel speed, by reversing the pressure switching two-way valve (dispensed within the invention).

The foregoing control system is particularly advantageous where the pilot valve is connected to a pressure switching two-way valve to which second inlet connection a line emerging from a control pressure pick-off assigned to the travel direction and velocity is connected, in which case the outlet line of one of the pressure switching two-way valves is connected to a pressure chamber of the adjusting element of the assigned power transmission.

The pilot valve is advantageously a 3-position 3-way valve (3/3-way valve) that is controlled either hydraulically by the pressure that comes from a control pressure pick-off that determines the travel direction and speed or it may also be a pneumatic or electric control, in which case the use of an electrically controlled solenoid valve is expedient, especially in very large vehicles.

An additional advantageous refinement for vehicles in which each hydrostatic power transmission unit is equipped with an adjustable pump and an adjustable motor is provided with an adjusting piston that can be acted upon from both sides and one side of the adjusting piston of the motors is connected through a pressure switching two-way valve with the same control pressure pick-off assigned to the direction and speed of travel and each of the control pressure pick-offs assigned to the cornering direction is connected directly with the pressure chamber on one side of the adjusting piston of the hydraulic motor of the assigned power transmission and in which the pilot valve is connected between the line leading to the adjusting element of the hydraulic motor and the adjusting element of the pump of the respective power transmission.

The four control pressure pick-offs can be arranged in the vehicle so that the two control pressure pick-offs determining the direction and speed of travel are arranged in the longitudinal direction of the vehicle and the other two control pressure pick-offs are arranged crosswise, shifted by 90° with respect to the first two, and that a universal joint-coupled, arbitrarily actuatable steering lever is located in the middle, from which one or two control pressure pick-offs shifted by 90° with respect to each other can be actuated as desired. However, it is also possible to install the two control pressure pick-offs assigned to control of the direction and speed of travel at one point of the vehicle and actuate them by a hand lever or, for example, by means of a bascule-like foot pedal, and to install the two control pressure pick-offs assigned to the cornering directions and curve radii at another site of the vehicle and provide for actuation by a hand lever or each of these control pressure pick-offs by a pedal.

Two circuit diagrams for an implementation example are shown in the drawings in which.

Only the operating cylinders, in which the adjusting pistons are capable of sliding, of the hydrostatic power transmission units are depicted in the two circuit diagrams.

Figure 1:
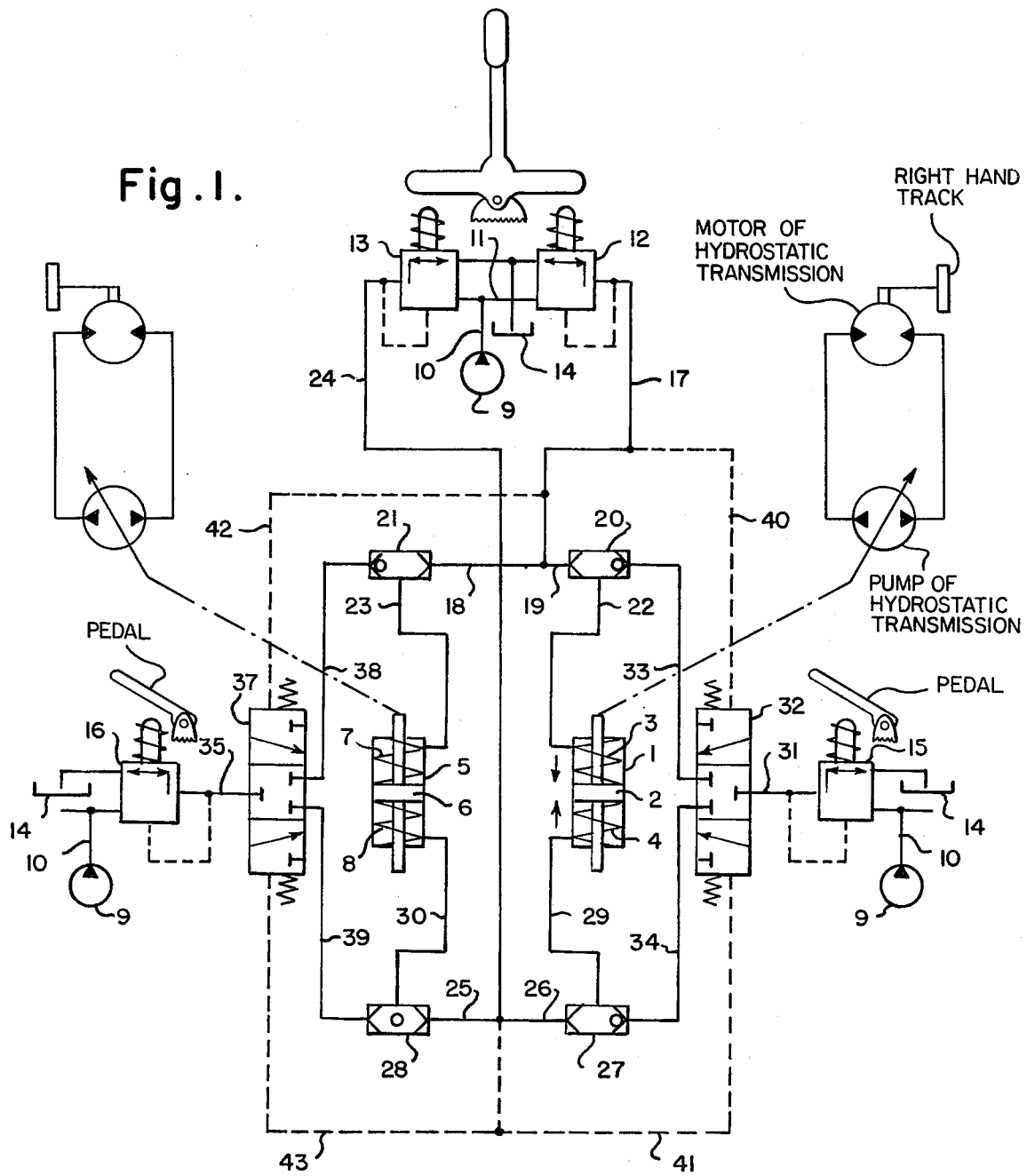
FIG. 1 shows the circuit diagram for a vehicular drive in which only the pump of each power transmission unit is adjustable.

In FIG. 1 the adjusting piston 2, tensioned between two springs 3 and 4, is capable of sliding in the operating cylinder 1 and is connected with the final control element (not shown in the drawing) of the pump of the hydrostatic power transmission unit of the right side of the vehicle. The adjusting piston 6, which is connected with the final control element of the pump of the power transmission unit assigned to the left side of the vehicle, is capable of sliding in the operating cylinder 5. This adjusting piston 6 is tensioned between two springs 7 and 8. A control pressure line 10 comes from a control-pressure pump 9 and it branches into two control pressure lines 11, which lead to the two control pressure pick-offs 12 and 13. Of the latter, the control pressure pick-off 12 determines the travel speed during forward movement and the control pressure pick-off 13 determines the travel speed during backward movement. The two control pressure pick-offs 12 and 13 are also connected to a pressure-less reservoir 14.

The control pressure pick-off 15 determines the cornering to the right and the size of the curve radius and the control pressure pick-off 16 detemines the cornering to the left and the curve radius.

A control pressure line 17 comes from the control pressure pick-off 12 and branches into two lines 18 and 19, each of which leads to a pressure switching two-way valve 20 or 21. The control pressure line 22 coming from the pressure switching two-way valve 20 leads to the pressure chamber in operating cylinder 1, in which the pressure spring 3 is located.

The control pressure line 23 coming from the pressure switching two-way valve 21 leads to the pressure chamber in the operating cylinder 5, in which the pressure spring 7 is located.

A control pressure line 24 comes from the control pressure pick-off 13 and branches into the two control pressure branch lines 25 and 26, from which the control pressure line 26 leads to the pressure switching two-way valve 27 and the control pressure branch line 25 leads to the pressure switching two-way valve 28. The control pressure line 29 coming from the pressure switching valve 27 also leads to the operating cylinder 1 and is connected to the pressure chamber of the latter, in which the pressure spring 4 is located, i.e., it is connected to the pressure chamber opposite the pressure chamber to which the control pressure line 22 is connected. Correspondingly, a control pressure line 30 comes from the pressure switching two-way valve 28 and is connected to the pressure chamber of the operating cylinder 5, in which the spring 8 is capable of sliding.

A control pressure line 31 comes from the control pressure pick-off 15 and leads to the 3/3-way valve 32, from which two control pressure lines 33 and 34 emerge, the control pressure line 33 of which is connected to the second connection of the pressure switching two-way valve 20 and the control pressure line 34 is connected to the second connection of the pressure switching valve 27.

Analogously, a control pressure line 35 comes from the control pressure pick-off 16 and leads to a pilot valve 37, to which two control pressure lines 38 and 39 are connected, of which the control pressure line 38 is connected to the second connection of the pressure switching two-way valve 21 and the control pressure line 39 is connected to the second connection of the pressure switching valve 28.

The pilot valve 32 is controlled hydraulically, in which case the one control pressure chamber is connected through a control line 40 to the control pressure line 17 and the second control pressure chamber is connected through a control line 41 to the control pressure line 24.

Analogously, the pilot valve 37 is a hydraulically controlled valve, whose one control pressure chamber is connected through a control line 42 to the control pressure line 17 and whose other control pressure chamber is connected through a control line 43 to the control line 24.

The mode of operation is as follows:

If the vehicle is to move forward, the control pressure pick-off 12 is actuated, with the result that a pressure builds up in the control pressure line 17 and is distributed through the two control pressure lines 18 and 19 and the control pressure lines 22 and 23 uniformly to a presssure chamber of the operating cylinder 1 and 5 and in the operating cylinder 1 on the control pressure chamber in which the spring 3 is located and in the operating cylinder 5 on the control pressure chamber in which the spring 7 is located, in which case the two control pressure chambers effect a displacement of the adjusting piston 2 or 6 such that the assigned pump sets the power transmission unit to the rotation direction for forward travel, where the speed on the driven side is determined by the control pressure in the control pressure line. Because the control pressure lines 33 and 38 are pressure-less, the two pressure switching two-way valves 20 and 21 are switched as shown in the drawing, i.e., the vehicle moves straight forward with the speed selected, in which case a straight forward travel is assured by the fact that the two adjusting pistons 2 and 6 are acted upon by the same control pressure From the control pressure line 17 the two control pressure lines 40 and 42 are acted upon by pressure, such that the two pilot valves 32 and 37 are switched so that pilot valve 32 connects the control pressure line 31 with the control pressure line 34 and shuts off the control pressure line 33 and that the pilot valve 37 connects the control pressure line 35 with the control pressure line 39 and shuts off the control pressure line 38.

Now if a curve is to be negotiated to the right, the control pressure pick-off 15 is actuated and generates a control pressure in the control pressure line 31 that is transferred to the line 34 as a result of the switching position achieved in the pilot valve 32. Because the control pressure line 24 and thus the control pressure branch line 26 are pressure-less, the pressure switching two-way valve 27 connects the control pressure line 34 with the control pressure line 29, so that the pressure of the control pressure pick-off 15 acts on the other side of the adjusting piston 2 as the pressure of the control pressure pick-off 12. That is, the control pressure determined by the control pressure pick-off 12 acts in the control pressure chamber in which the spring 3 is located, just as in the operating cylinder 5. At the adjusting piston 2 the control pressure determined by the control pressure pick-off 15 acts against this control pressure. If the two control pressure pick-offs 12 and 15 generate the same pressure, the adjusting piston 2 is moved into the neutral position and the power transmission unit assigned to the right side of the vehicle is switched to the stop position. If the control pressure of the control pressure pick-off 15 is now increased, the pressure presses the adjusting piston 2 through the neutral position back against the force of spring 3 and the control pressure of the control pressure pick-off 12 in the pressure chamber of the operating cylinder 1 in which the spring 4 is located, such that the power transmission unit assigned to the right side of the vehicle is turned in the direction of backward movement. This means that the vehicle begins to turn on the spot.

If the control pressure pick-off 12 is not actuated, but rather the control pressure pick-off 13, the pressure chamber in operating cylinder 1, in which the pressure spring 4 is located, and the pressure chamber in operating cylinder 5, in which the pressure spring 8 is located, are acted upon through the control pressure line 24, the control pressure lines 25 and 26, the pressure switching two-way valves 27 and 28, and the control pressure lines 29 and 30, with the result that the two power transmission units rotate to the same degree so that the vehicle travels backward. Because the control lines 40 and 42 are pressure-less in this case, but the control lines 41 and 43 carry the pressure generated by the control pressure pick-off 13 in the control pressure line 24, the pilot valves 32 and 37 are switched so that pilot valve 32 connects the control pressure line 31 with the control pressure line 33 and that the pilot valve 37 connects the control pressure line 35 with the control pressure line 38. This has the result that when the control pressure pick-off 15 is actuated, the control pressure produced by it is conveyed through the control pressure line 31 and the control pressure line 32 and the pressure switching two-way valve 20 and the control pressure line 22 into the pressure chamber of the operating cylinder 1, in which the pressure spring 3 is located. In this case also, the pressure produced by the control pressure pick-off 15 thus acts against the pressure produced by the control pressure pick-off 13.

If the control pressure pick-off 15 is not actuated, but rather the control pressure pick-off 16, there is accordingly the same effect as when the control pressure pick-off 15 is actuated on the other side of the vehicle.

If neither of the control pressure pick-offs 12 or 13 is acted upon, an actuation of the control pressure pick-off 15 or control pressure pick-off 16 has no effect on the power transmission because in this case the pilot valve 32 shuts off control pressure line 31 and pilot valve 37 shuts off control pressure line 35. An erroneous or unintentional actuation of one of these control pressure pick-offs 15 and 16 when the vehicle is standing still thus remains without effect.

Figure 2:
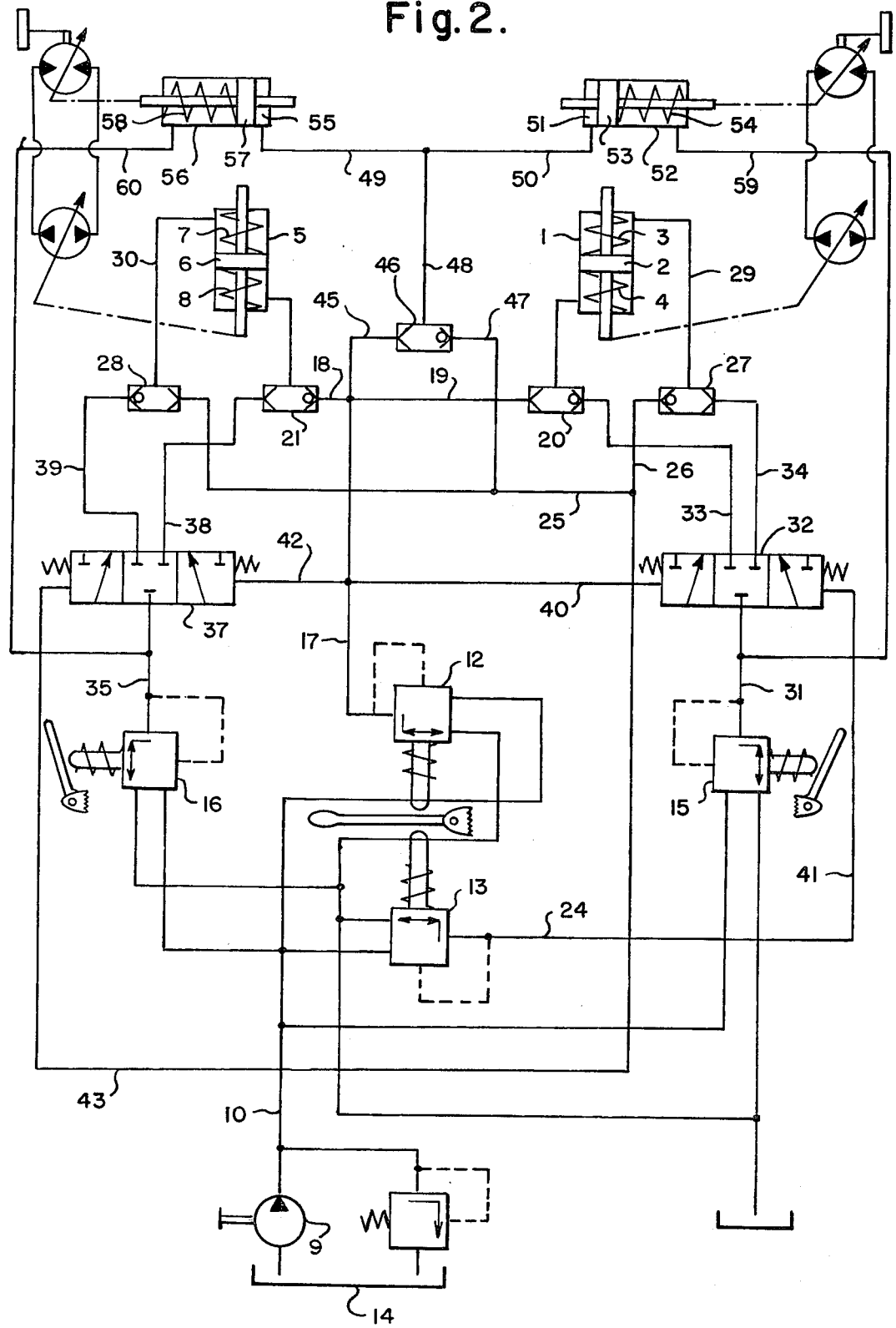
FIG. 2 shows the circuit diagram for a hydrostatic power tansmission unit in which both the pumps and the motors are adjustable.

The circuit scheme in FIG. 2 is expanded as compared with that in FIG. 1 by the control elements for regulating the hydraulic motors. The same components are given the same reference numbers in both drawings.

A control pressure line 45 is connected to the control pressure line 17 and it leads to a pressure switching two-way valve 46, to which the control pressure line 47 connected through the control pressure branch line 25 to the control pressure line 26 is also connected. A control pressure line 48 comes from the pressure switching two-way valve 46 and is branched into the two branch lines 49 and 50, of which branch line 50 is connected to the pressure chamber 51 of the operating cylinder 52 of the hydraulic motor of the power transmission on the right side of the vehicle. In this operating cylinder 52 the adjusting piston 53, which is connected with the final control element of the hydraulic motor, is capable of being displaced against the force of a pressure spring 54, while there is no spring in pressure chamber 51.

Analogously, the control pressure line 49 is connected to the pressure chamber 55 of the operating cylinder 56, in which the adjusting piston 57 is capable of sliding, which is connected with the final control element of the hydraulic motor of the power transmission of the left side of the vehicle. There is a spring 58 in the second pressure chamber of the operating cylinder 56.

A control pressure line 59 branches off from the control pressure line 31 and leads to the pressure chamber of the operating cylinder 52, in which the spring 54 is located. A control pressure line 60 branches off from the control pressure line 35 and leads to the pressure chamber of the operating cylinder 56, in which the pressure spring 58 is located.

If the control pressure pick-off 12 is actuated, the operating characteristics elucidated in connection with FIG. 1 set in. In addition, the spring-less pressure chamber 51 or 55 of the operating cylinders 52 and 56 is acted upon through the control pressure line 45 connected to the control pressure line 17 and the lines 48, 49 and 50, so that both hydraulic motors of one power transmission unit are adjusted to the same degree toward a smaller stroke volume per revolution, insofar as the control pressure suffices, in order to displace the piston 53 or 57 against the force of the spring 54 or 58.

Now if the control pressure pick-off 15 is also acted on, the mode of operation described in connection with FIG. 1 sets in with respect to regulation of the pumps. In addition, the operating cylinder 52 of the motor of the power transmission unit assigned to the right side of the vehicle is loaded through the control pressure line 59, in which case the pressure produced by the control pressure pick-off 15 and present in line 59 acts against the pressure produced by the control pressure pick-off 12 and present in line 50 at the adjusting piston 53.

By means of this pressure present in the control pressure line 59, a force is generated at the adjusting piston 53 that acts in addition to the force of the spring 54 and displaces the adjusting piston 53 toward a greater stroke volume of the assigned motor. During this, the adjusting piston 57 of the motor of the left-hand power transmission unit remains unaffected by the pressure of the control pressure pick-off 15 and is influenced only by the pressure of control pressure pick-off 12. When control pressure pick-off 12 is actuated, the vehicle will thus move forward. When the control pressure pick-off 15 is also actuated, it will corner to the right and when control pressure pick-off 16 is also actuated, it will corner to the left. The corresponding effects occur for backward movement when the control pressure pick-off 13 and possibly also control pressure pick-offs 15 or 16 are actuated.

It is quite readily possible, in a manner not shown in the drawing, also to connect drain lines to all the control pressure lines, the which drain lines are connected with a pressure-less reservoir either through an arbitrarily actuatable drain valve in order to brake the vehicle or through a maximum load valve with the pressure-less reservoir, in which case this maximum load valve opens automatically when a maximum load is exceeded, for example, when the r.p.m. of the internal combustion engine driving the two power transmission units in common drops as a result of overloading of the power absorbed in common by the two power transmission units.

In the foregoing specification, I have set out certain preferred embodiments and practices of my invention, however, it will be understood that this invention may be otherwise embodied within the scope of the following claims.

I claim:

1. In a control for the drive of a vehicle with differential speed steering and with a hydrostatic power transmission for the drive of each vehicle side, where the adjusting element of each of the two power transmissions is provided with a spring-loaded adjusting piston that can be acted upon by a control pressure that is adjustable by an arbitrarily actuatable control pressure pick-off, in which two pairs of control pressure pick-offs are provided, of which one control pressure pick-off of one pair is assigned to the forward movement and the other control pressure pick-off of this pair is assigned to the backward movement and each control pressure pick-off of this pair is capable of being connected with the adjusting elements of the power transmission of both vehicle sides and each control pressure pick-off of the other pair is assigned to a cornering direction and is capable of being connected with the adjusting element of the power transmission of the vehicle side on the inside of the cornering curve and where each adjusting piston can be acted upon from both sides and can be acted upon by one control pressure pick-off of the one control pressure pick-off pair in order to control the direction and velocity of movement on one side and can be acted upon by a control pressure pick-off of the other control pressure pick-off pair in order to control the cornering radius on the other side, the improvement characterized in that a switchable pilot valve that is dependent on the pressure in a control pressure line emerging from a control pressure pick-off of the control pressure pick-off pair assigned to the travel direction and velocity is located in the connecting line between one of the control pressure pick-offs assigned to the cornering and the adjusting element of the assigned power transmission, and in which the pilot valve connects the control pressure pick-off assigned to the cornering movement with the pressure chamber of the adjusting element of the power transmission of the vehicle side on the inside of the cornering curve which is not acted upon by the control pressure generated by one of the control pressure pick-offs of the control pressure pick-off pair assigned to the direction and velocity of travel.

2. Control according to claim 1, characterized in that the pilot valve is connected to a pressure switching two-way valve, to which second inlet connection a line emerging from a control pressure pick-off assigned to the travel direction and velocity is connected, and in which case the outlet line of one of these pressure switching two-way valves is connected to a pressure chamber of the adjusting element of the assigned power transmission.

3. Control according to claim 1, characterized in that each pilot valve is a 3/3-way valve.

4. Control according to claim 3, characterized in that each pilot valve is a hydraulically controlled valve.

5. Control according to claim 3, characterized in that each pilot valve is an electrically controlled pilot valve.

6. Control for a drive with hydrostatic power transmissions, in which case in each power transmission both the pump and the motor are adjustable and are provided with an adjusting piston that can be acted upon from both sides and one side of the adjusting piston of the motors is connected through a pressure switching two-way valve with the same control pressure pick-off assigned to the direction and speed of travel and each of the control pressure pick-offs assigned to the cornering direction is connected directly with the pressure chamber on one side of the adjusting piston of the hydraulic motor of the assigned power transmission, characterized in that the pilot valve is connected between the line leading to the adjusting element of the hydraulic motor and the adjusting element of the pump of the respective power transmission.

7. Control according to claim 1 or 2 or 3 or 4 or 5 or 6, characterized in that a discharge valve is connected to the control pressure lines coming from the control pressure pick-off assigned to the direction and speed of travel, which discharge valve automatically opens at one of a preset load and on manual operation and one of load responsive means operatively connected to said control pressure lines and a manually operated lever connected to said discharge valve for operating the same between open and closed positions.

* * * * *